Patented Nov. 23, 1937

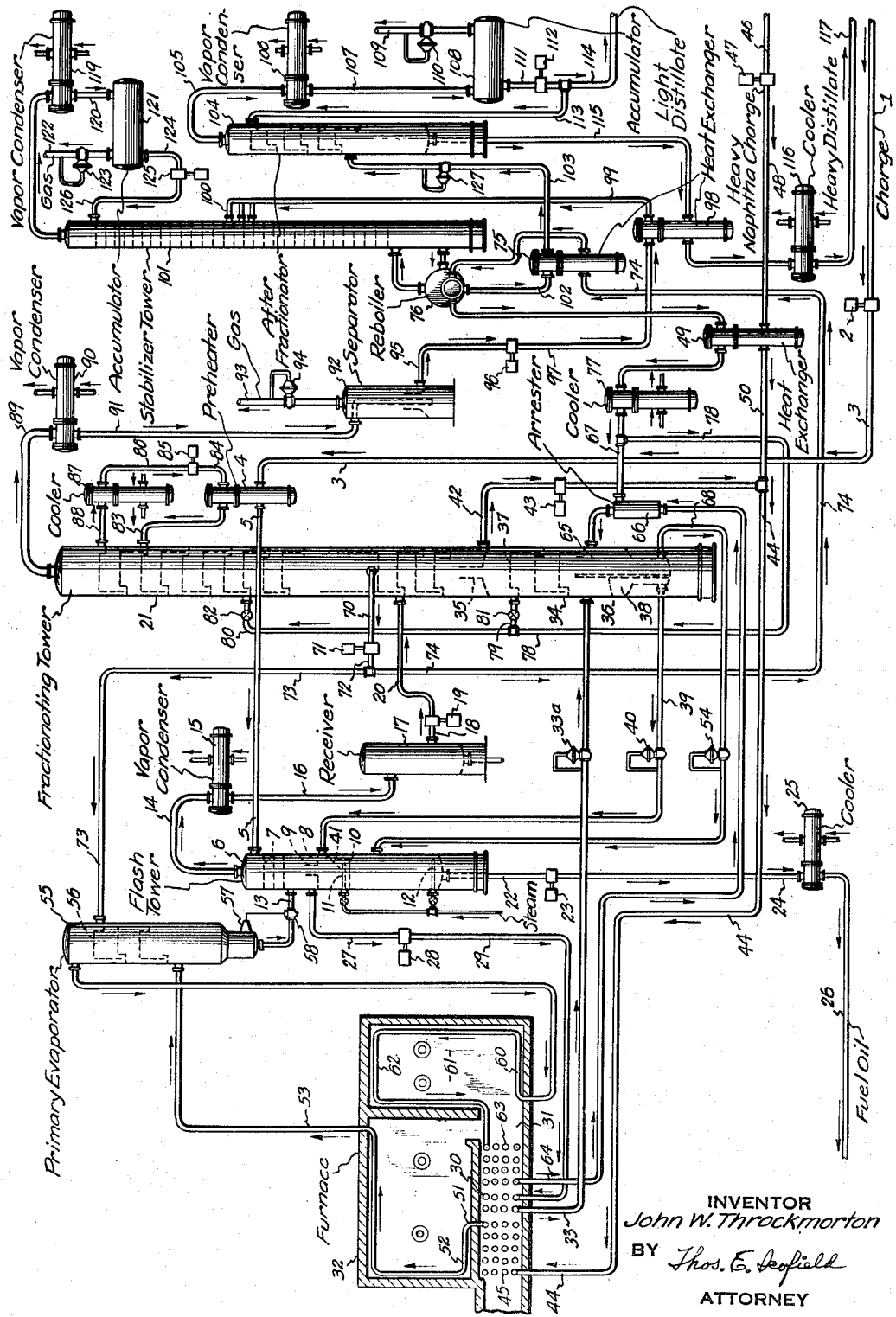

2,100,062

UNITED STATES PATENT OFFICE 2,100,062

CRACKING OF HYDROCARBON OIL

John W. Throckmorton, New York, N. Y., assignor to Gyro Process Company, Detroit, Mich., a corporation of Michigan Application April 3, 1935, Serial No. 14,449

8 Claims. (Cl. 196—60)

My invention relates to the cracking of hydrocarbon oil for the production therefrom of lower boiling hydrocarbons and more particularly to certain new and useful improvements in vapor phase cracking.

In that type of vapor phase cracking known as the "Gyro Process", the oil to be converted is subjected to a primary cracking or "viscosity breaking" effect to increase the percentage of low boiling hydrocarbons in the oil which is then flashed in an evaporator into vapors and unvaporized oil. The vapors are then cracked in the vapor phase.

This operation is carried out at a relatively low pressure, thus limiting the temperature of primary cracking and, as a result, the temperature at which the vapors pass to the vapor phase cracking coil. If a too high temperature is carried in the evaporator, the boiling range of the vapors will be too wide for the vapor phase cracking step. Also, the heavier, unvaporized oil in the evaporator will be subject to coking with attendant disadvantages.

The relatively low pressure also makes necessary the use of large sized fractionating, flashing and evaporating towers for satisfactory separation and fractionation. The complete recovery of constituents of gasoline boiling range from the overhead vapors of the fractionating tower is dependent upon the use of auxiliary compression and absorption equipment.

It is an object of my invention to provide a vapor phase cracking process which will permit the maintenance of higher temperatures in the evaporator without objectionable coking.

It is a further object of my invention to reduce the heat load on the vapor phase cracking coil and to reduce fuel consumption by maintaining a higher temperature of the vapors passing to the vapor phase cracking coil.

It is a further object of my invention to further reduce the burden on the vapor phase cracking coil by limiting the quantity of very low boiling hydrocarbons in the vapors.

It is a further object of my invention to provide a vapor phase cracking process with which fractionating and separating equipment of smaller dimensions may be used.

Another object of my invention is to provide a vapor phase cracking process to operate at pressures sufficiently high to permit economical condensation and recovery of constituents of gasoline boiling range without resorting to expensive compression and absorption equipment.

Other and further objects of my invention will appear from the following description.

The accompanying drawing, which forms part of the instant specification and which is to be read in conjunction therewith, is a schematic showing in elevation, with parts in section, of one form of apparatus capable of carrying out the process of my invention.

In general, fresh feed or charging stock such as, for example, a reduced crude oil, is preheated and passed to a low pressure flash tower where, at a low, or substantially atmospheric pressure, low boiling constituents are distilled from the oil, condensed and charged to a fractionating tower operating under a pressure of, for example, from 50 to 150 lbs. per square inch. The distillation of the crude oil for the control of its initial boiling point is effected in the low pressure flash tower by heat applied from recycle stock withdrawn from a primary evaporator which will be hereinafter described and by the carrying effect of a large quantity of hotter vapors stripped from previously cracked oil introduced to the flash tower, as will hereinafter more fully appear.

The mixture of distilled charging stock and recycle stock is passed at relatively high velocity through a heating coil, where it is cracked in the liquid phase at pressures of from 100 to 250 lbs. per square inch and at temperatures of from 850° F. to 950° F. The products of this liquid phase cracking reaction are flashed in a vaporizing chamber (preferably forming part of the fractionating tower), the gas, gasoline and some higher boiling constituents passing upwardly in the form of vapors into the fractionating tower. The unvaporized oil, in which a large proportion of light ends is usually retained under the pressure conditions, is passed to the low pressure flash tower where it is separately stripped with steam, the resulting vapors rising upwardly through the tower aiding in the distillation of the charging stock by reason of their higher temperature and mass effect and ultimately being condensed at least in part and returned as recycle stock to the liquid phase cracking coil.

The charge to the vaporizing coil is formed by reflux condensate which accumulates in the bottom of the fractionating tower and is withdrawn from the tower, heated to vaporizing temperatures of from 800° F. to 900° F. at pressures of from 100 to 250 lbs. per square inch (with preferably a minimum of cracking) and is flashed in a primary evaporator into vapors and unvaporized oil. The amount of unvaporized oil is usually small though this is dependent upon the boiling range of the reflux condensate charged to the primary evaporator, which range may be such that a considerable quantity of the oil in this evaporator will not be vaporized.

Control of the temperature of the unvaporized oil in the evaporator determines the amount of heat which will be available in the low pressure flash tower for distillation of the charging stock. The unvaporized oil in the primary evaporator is continuously withdrawn therefrom to prevent an accumulation of oil in quantities at which a tendency to coke might exist and passed to the low pressure flash tower, where as a reboiling medium, the oil imparts heat to and aids in the distillation of low boiling constituents from the charging stock.

The vapors, at the pressure existing in the primary evaporator, pass through suitable heating and soaking coils and are cracked in the vapor phase at temperatures of from 1000° F. to 1200° F. after which the products of reaction are quenched below active vapor phase cracking temperature. The quenched products are then flashed in a separate chamber of the same flash tower, in which the products of the primary or liquid phase cracking operation are flashed, to maintain separation of the fuels. The gas, gasoline and some of the higher boiling constituents vaporized in this flash tower pass upwardly into the main fractionating tower for subsequent fractionation. This unvaporized oil of refractory character accumulating in this chamber of the flash tower, is withdrawn separately and passed to the low pressure flash tower where it is separately stripped with steam, the vapors aiding in the distillation of the charging stock. The residue collecting in the low pressure flash tower, which forms a blended fuel oil, is withdrawn from the tower, cooled, and passed to storage.

The low boiling hydrocarbons which leave the fractionating tower as an overhead product, are cooled and condensed, the condensate being separated from the uncondensed gas and then stabilized for vapor pressure specifications. The stabilized distillate is separately fractionated at a lower pressure for the recovery of distillates of the desired boiling range.

End point control in the various flash towers is provided for by a light, cool, clean side stream, withdrawn from the fractionating tower, and diverted through suitable piping to the flash towers and to the arrester.

Referring now more particularly to the drawing, the charging stock, for example an East Texas reduced crude of 27° A. P. I. gravity, is fed to the system through a pipe 1 to a pump 2 and is pumped thereby through a pipe 3 to a preheater 4. A certain amount of heat is picked up by the charge in this preheater, the charge then passing through a pipe 5 to the top tray of a flash tower 6 maintained at substantially atmospheric pressure.

The flash tower 6 is provided at its upper portion with a plurality of fractionating trays 7, below which is located a collecting tray 8, in which is formed a vapor riser 9. Below the collecting tray is a pan 10 provided with a pipe 11 for the introduction of steam for stripping. A second pipe 12 is located within the tower adjacent its bottom for the introduction of steam for the same purpose. As will be pointed out hereinafter, the pan 10 permits the separation of fuel oils until the light ends have been removed.

The charge which is introduced to the tower 6 through the line 5 flows downwardly over the trays 7 giving up its light constituents due to distillation resulting from the imparting of heat to the oil from hot unvaporized oil fed to the tower through a line 13. The distillation of the charging stock for the establishment of the desired initial boil-point is also materially aided by the relatively large volume of hot vapors and steam rising upwardly in the tower through the vapor riser 9 countercurrent to the downflowing charging stock. Some of these vapors will remain uncondensed and in conjunction with the light ends of the charging stock, pass overhead from the flash tower through the line 14 to a vapor condenser 15. The condensate formed in this condenser passes with the uncondensed constituents through a pipe 16 to a receiver 17 from which the condensate, vapors and gases pass through a pipe 18, being pumped by pump 19 through a pipe 20 to a suitable section of a fractionating tower 21.

The liquid fuel oil residue which accumulates in the bottom of the flash tower 6 is withdrawn through pipe 22 and is pumped by pump 23 through pipe 24 to cooler 25 from which it discharges through a pipe 26 to storage tanks (not shown).

The oil which accumulates on the tray 8, comprising recycle stock from line 13, reflux condensate and charge oil, leaves the tray 8 through a line 27 and is pumped by a pump 28 at a pressure of from 250 to 400 lbs. per square inch through a pipe 29 to a heating coil 30 located in a convection heating passageway 31 of a furnace setting 32. This coil forms the primary or liquid phase cracking coil of the furnace and the oil is heated to a temperature of from 850 to 950° F. while passing through the coil at high velocity. The amount of cracking which takes place in this coil is sufficient only to produce suitable charge for the vapor phase cracking coil. The reactant leaves the coil 30 through a pipe 33 and passes through pressure reducing valve 33a to a separator 34.

The separator 34 is formed as is shown as an integral lower section of the fractionating tower 21 connecting therewith through a vapor riser 35 and being internally divided at its lower portion into separate chambers 38 and 65 by an imperforate baffle 36. The upper portion of the separator is provided with a plurality of fractionating trays 37 and the pressure within the separator will be substantially the same as that existing in the fractionating tower, that is, from 50 to 150 lbs. per square inch.

The reactant from the liquid phase cracking coil 30 is separated in the chamber 38 of this separator into vapors and unvaporized oil. Preferably the degree of vaporization due to the temperature and pressure conditions is such that only the gas, gasoline, and a relatively small amount of heavier constituents will pass overhead into the fractionating tower through the vapor riser 35. The unvaporized oil which accumulates in the chamber 38 at a temperature of from 800 to 850° F. is discharged therefrom through a pipe 39 in which the pressure is reduced through a reducing valve 40. The oil at the reduced pressure is fed through the pipe 39 to the flash tower 6 wherein it flows downwardly over a deflecting plate 41 into a stripping pan 10. The reduced pressure and the steam introduced through the pipe 11 will vaporize some of the oil, which vapors will pass upwardly through the vapor riser 9 and by their carrying effect aid in the distillation of the crude as has been previously pointed out. The unvaporized oil in the pan 10 continually overflows and is collected in the sump in the base of the tower 6.

The charge for the vaporizing coil is formed by reflux condensate which accumulates in the bottom of the fractionating tower 21. The pressure within the tower and the closeness of the fractionation is such that this reflux condensate will have a boiling range of from 300° F. to 650° F. for example. The reflux condensate leaves the fractionating tower through a pipe 42 connected to a pump 43 which pumps the oil through a pipe 44 to a preheating coil 45 located in the convection heating passage 31 of the furnace setting 32. If desired, additional charging stock such as, for example, heavy naphtha to be reformed may be passed through a pipe 46 to a pump 47 by which it is charged through a pipe 48 to a preheater 49 from which the heated naphtha passes through a pipe 50 and joins the reflux condensate in the pipe 44.

The heated oil leaving the convection heating coil 45 passes through a pipe 51 to the serially connected radiantly heated tubes 52 of the relatively low temperature heating section of the furnace setting 32. The oil is heated in this section to a temperature of from 800 to 900° F. under a pressure of from 100 to 200 lbs. per square inch at such a rate that little or no cracking takes place. The heated oil leaves the radiantly heated tubes 52 through a pipe 53, and is discharged at this pressure into a primary evaporator 55 where it is separated into vapors and unvaporized oil.

The primary evaporator 55 is provided at its upper portion with any suitable number of fractionating trays 56 and at its lower portion with a liquid level control member operating a flow control valve 58 in the transfer line 13 joining the evaporator with the low pressure flash tower 6. The liquid level control 57 is so adjusted that only a small quanity of unvaporized oil is permitted to accumulate in the bottom of the evaporator 55 in order to minimize coking of the unvaporized oil by reason of the relatively high temperature of, for example, 800 to 850° F. in the evaporator.

The vapors in the evaporator are discharged therefrom under a pressure of from 100 to 250 lbs. per square inch through a pipe 59 to drying tubes 60 in the high temperature vapor phase cracking section 61 of the furnace setting 32. From the tubes 60, the dry vapors pass through the tubes of a radiantly heated section 62 wherein they are rapidly brought up to a vapor phase cracking temperature of from 1000° F. to 1200° F. and from which section the vapors pass to the tubes of a convection heated soaking section 63 located in the convection heating passageway 31. The arrangement of the radiant and soaking section is by way of example only and, of course, may be modified to secure the optimum conditions of time and temperature for the vapor phase cracking operation.

After a proper time interval, the reactant from the vapor phase cracking operation discharges from the soaking section 63 in vapor form and through a pipe 64 into a flash chamber 65 in the separator 34. The vapors during their passage to the chamber 65 are quenched below active vapor phase cracking temperature in an arrester 66 by means of cooler hydrocarbon quench oil fed to the arrester through a pipe 67. The quenched reactant and quench oil in the chamber 65 being subjected in the flash chamber 65 to substantially the same pressure as exists within the fractionating tower 21 separate into vapors and unvaporized oil, the vapors rising upwardly through the vapor riser 35 into the fractionating tower. The unvaporized oil will still contain at this pressure some relatively light constituents suitable as recycle cracking stock and this unvaporized oil is therefore discharged from the chamber 65 through the pipe 68 and pressure reducing valve 54 into the flash tower 6 below the collecting pan 10. This oil which is, for the most part, highly refractory in character and by virtue of the quenching, at a somewhat lower temperature than the less refractory oil passed through the pipe 39 to the flash tower 6 is preferably kept out of direct contact with this higher temperature less refractory material until after the light ends have been stripped from these fuels in the low pressure flash tower 6. The vapors rising upwardly through the vapor riser 9 aid in the distillation of the charge oil, those vapors remaining uncondensed in the low pressure tower 6 being returned after condensation to the fractionating tower through the lines 14 and 20.

The quench oil and reflux for end point control in the various towers is withdrawn from the fractionating tower 21 as a clean sidestream through a pipe 70 by means of a pump 71 which forces the oil through a pipe 72 and a branch pipe 73 to the upper tray of the primary evaporator 55. Another portion of the oil from the pipe 72 passes through a branch pipe 74, heat exchanger 75, reboiler 76, heat exchanger 49, cooler 77, and pipe 67 to the arrester 66. The remainder of the cool oil issuing from the cooler 77 passes through the pipe 78 from which it passes through the branch pipes 79 and 80 controlled by valves 81 and 82 respectively, into the separator 34 and fractionating tower 21, respectively. Additional reflux from the fractionating tower 21 is withdrawn from a suitable tray through a pipe 83, passes through the heat exchanger 4 from which it passes through a pipe 84 to a pump 85. The pump 85 forces the partially cooled oil through a pipe 86 to a cooler 87 from which it discharges and is returned through a pipe 88 to the upper portion of the fractionating tower 21.

The hydrocarbons not condensed in the fractionating tower 21 pass overhead through a transfer line 89 to a vapor condenser 90 wherein at the pressure existing within the fractionating tower and with the normally available cooling medium, condensation of substantially all of the hydrocarbons is accomplished. The condensate, vapors and gases are discharged from the condenser 90 through a pipe 91 to a gas separator 92 from which some of the uncondensed gaseous hydrocarbons, for example propane and lighter, escape through a vent pipe 93 in which is located a back pressure control valve 94.

The distillate, substantially of motor fuel boiling range but containing for example a considerable amount of butane and lighter hydrocarbons, is discharged from the separator 92 through a pipe 95 to a pump 96 which forces the unstabilized distillate through a pipe 97 to a heat exchanger 98 wherein it picks up some heat from finished heavy distillate flowing through this exchanger. The heated unstabilized distillate leaves the exchanger 98 through a pipe 99 from which it passes in controlled amounts through any one, or all of a number of branch pipes generally indicated as 100 into a pressure stabilizer tower 101. The stabilized distillate now containing only sufficient butane to satisfy the requirements as to vapor pressure leaves the reboiler 76 of the stabilizer 101 through a pipe 102 through which it passes to the heat exchanger 75, picking up some heat and on discharging therefrom, passes through the pipe 103 and back pressure control valve 127 to an after-fractionator 104 held at a lower pressure wherein the distillate is rectified into a light distillate as an overhead product and a heavy distillate as a bottom product. The light distillate passes overhead in vapor form through a vapor line 105, is condensed in the vapor condenser 106 from which it discharges from a pipe 107 to an accumulator 108. The gases remaining uncondensed are vented through a vent line 109 provided with a back pressure control valve 110. The light distillate is withdrawn from the accumulator 108 through a pipe 111 by means of a pump 112 which returns a portion through the branch pipe 113 to the after-fractionator as reflux for end point control. The remainder of the light distillate discharges through the pipe 112 to storage tanks not shown.

The heavy distillate accumulating as a bottom product in the after-fractionator 104 is withdrawn in liquid form through a pipe 115, passes through the heat exchanger 98 and cooler 116 and is then discharged through the pipe 117 to storage tanks not shown.

The stabilizer tower 101 is refluxed by vapors passing overhead through the vapor line 118 to a vapor condenser 119 wherein they are condensed, the liquid passing through a pipe 120 to a reflux accumulator 121 from which the uncondensed gases are discharged through a vent line 122 controlled by a back pressure control valve 123. The liquid leaves the accumulator through a pipe 124 and is returned by the pump 125 through the line 126 to the upper portion of the stabilizer tower as reflux.

It will be observed that the objects of the invention have been accomplished and a high pressure vapor phase cracking process has been provided by which the size of the fractionating tower, flash towers, and primary evaporator may be reduced and by which considerable savings and economy of operation are accomplished by reason of the elimination of expensive compression absorption equipment. This invention also reduces the load burden on the vapor phase cracking coil through the reduction in the amount of those very light constituents whose presence in the vapor phase cracking coil is undesirable. The invention also provides a means of reducing the heat requirements in the vapor phase cracking coil thereby securing increased fuel economy since the vapors enter this coil at a higher temperature. This invention also permits an increased yield of low boiling hydrocarbons from the initial charge through the controlled separation of the fuel oil from the reactant of the separate cracking stages.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. For example, if it is desired to produce ethylene as the low boiling hydrocarbon, the process may be operated at higher temperatures so that the cracking reaction will proceed to the formation of the desired gaseous products. Temperatures of over 1200° F. may be employed in case it is desired to produce ethylene. It is, therefore, to be understood that my invention is not to be limited to the specific details shown and described.

Having thus described my invention, what I claim is:

1. A cracking process comprising heating a hydrocarbon oil under a pressure substantially above atmospheric, separating the heated oil into vapors and unvaporized oil in an evaporating zone, combining the unvaporized oil with a charge oil in a flash zone maintained at a pressure substantially less than that in the evaporating zone, cracking the combined oil in the liquid phase, cracking the vapors in the vapor phase, quenching the reactant from the vapor phase cracking operation to below active vapor phase cracking temperature by means of a cooler hydrocarbon quench oil, separately separating the reactant from the liquid phase cracking operation and the quenched reactant into vapors and unvaporized oil in separating zones maintained at a pressure substantially above atmospheric, fractionating the last mentioned vapors in a single fractionating zone maintained at substantially the last mentioned pressure, returning the unvaporized oil in each of the last mentioned separating zones to the flash zone and removing and condensing vapors from said fractionating zone as a distillate product of the process.

2. The process of claim 1 in which the quench oil is withdrawn from the fractionating zone.

3. The process of claim 2 in which the oil to be heated is withdrawn from the fractionating zone.

4. A cracking process comprising commingling hydrocarbon oil to be cracked and heated recycle oil in a first flash zone maintained at substantially atmospheric pressure to thereby effect a separation of the commingled oils into vapors and unvaporized oil, fractionating the vapors in a fractionating zone maintained at a pressure substantially above atmospheric, cracking the unvaporized oil from said first flash zone in the liquid phase at a pressure substantially above atmospheric, separating the cracked reactant in a second flash zone maintained at a pressure substantially the same as that in said fractionating zone into vapors and unvaporized oil, fractionating the last mentioned vapors in said fractionating zone, separating in said first flash zone the last mentioned unvaporized oil into vapors and an unvaporized oil residue, fractionating the last mentioned vapors with the first mentioned vapors, withdrawing reflux condensate from said fractionating zone and heating said condensate at a pressure substantially greater than the fractionating pressure, separating the heated reflux condensate into vapors and an unvaporized recycle oil in an evaporating zone maintained at a pressure substantially above that in said fractionating zone and then performing said step of commingling in said first flash zone the last mentioned hot unvaporized recycle oil with the hydrocarbon oil to be cracked, cracking the last mentioned vapors separated in said evaporating zone in the vapor phase at a pressure substantially above atmospheric, quenching the cracked reactant from the vapor phase cracking operation to below active vapor phase cracking temperature with a cooler hydrocarbon oil, separating the cooled vapor phase reactant and quench oil into vapors and unvaporized oil in a third flash zone maintained at a pressure substantially the same as that in said fractionating zone, fractionating the last mentioned vapors evolved in said third flash zone in said fractionating zone and cooling the overhead products of the fractionating zone at substantially the pressure existing in the fractionating zone to recover a liquid distillate lower boiling than the charging stock.

5. The process of claim 4 including the steps of separating into vapors and an unvaporized oil residue in said first flash zone the unvaporized oil remaining after the separating operation performed on the vapor phase cracked reactant in said third flash zone and fractionating said last mentioned vapors in the fractionating zone.

6. A process of cracking hydrocarbon oil to form lower boiling hydrocarbons including the steps of cracking the hydrocarbon oil in the liquid phase, separating the cracked oil into vapors and unvaporized oil in a first flash zone maintained under superatmospheric pressure, dephlegmating vapors formed in said first flash zone in a dephlegmating zone, withdrawing the unvaporized oil from said first flash zone and flashing it into vapors and unvaporized oil in a second low pressure flash zone, withdrawing reflux condensate from the dephlegmating zone and heating it to vaporizing temperature, flashing the heated condensate into vapors and unvaporized oil in an evaporating zone maintained under a higher pressure than said second flash zone, withdrawing the unvaporized oil from said evaporating zone and flashing it in the second flash zone into vapors and unvaporized oil, dephlegmating vapors formed in said second flash zone in said dephlegmating zone, withdrawing the vapors from said evaporating zone and cracking them in the vapor phase, reducing the temperature of the vapor phase cracked products by contacting them with a cooler hydrocarbon oil, separating the cooled cracked products in a third flash zone into vapors and unvaporized cracked products, dephlegmating vapors formed in said flash zone in the said dephlegmating zone and condensing the dephlegmated vapors to recover lower boiling hydrocarbons.

7. A process as in claim 6 wherein the unvaporized cracked products separated from the cooled cracked products in said third flash zone are flashed into vapors and an unvaporized oil residue in said second flash zone, and the unvaporized oil residue withdrawn from the process.

8. A process as in claim 6 wherein the fresh hydrocarbon oil is introduced into the second flash zone into direct heat exchange with hot oil and vapors therein, and the hydrocarbon oil being cracked in the liquid phase comprises a mixture of the heated fresh oil and heated oil withdrawn from said second flash zone.

JOHN W. THROCKMORTON.